United States Patent
Jaiswal et al.

(10) Patent No.: US 11,646,020 B2
(45) Date of Patent: May 9, 2023

(54) COMMUNICATION NOTIFICATION MANAGEMENT

(71) Applicant: INTERNATIONAL BUSINESS MACHINES CORPORATION, Armonk, NY (US)

(72) Inventors: Priyansh Jaiswal, Boca Raton, FL (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/751,219

(22) Filed: Jan. 24, 2020

(65) Prior Publication Data

US 2021/0233525 A1    Jul. 29, 2021

(51) Int. Cl.
*G10L 15/22*    (2006.01)
*G10L 15/26*    (2006.01)
(Continued)

(52) U.S. Cl.
CPC .............. *G10L 15/22* (2013.01); *G06F 3/167* (2013.01); *G06Q 10/10* (2013.01); *G10L 15/26* (2013.01); *G10L 2015/223* (2013.01)

(58) Field of Classification Search
CPC ......... G10L 15/00; G10L 15/22; G10L 15/26; G10L 2015/223; G06F 3/00; G06F 3/167; G06Q 10/00; G06Q 10/10
See application file for complete search history.

(56) References Cited

U.S. PATENT DOCUMENTS

| 8,626,863 B2 | 1/2014 | Huang |
| 8,848,879 B1 | 9/2014 | Coughlan |

(Continued)

FOREIGN PATENT DOCUMENTS

| CA | 2430344 A | 5/2004 |
| CN | 103248757 B | 4/2016 |

(Continued)

OTHER PUBLICATIONS

Kirk et al., "A Method and System for Automatically Managing a Notification Sound for an Incoming Message", IP.com, IP.com No. IPCOM000256948D, Jan. 10, 2019, pp. 1-3.

(Continued)

*Primary Examiner* — Paras D Shah
*Assistant Examiner* — Sean E Serraguard
(74) *Attorney, Agent, or Firm* — Tihon Poltavets (57) ABSTRACT

A method for managing electronic communication notifications includes responsive to receiving a communication from a first user, identifying one or more keywords in the communication based on a plurality of keywords associated with a plurality of queries previously presented by a second user. Determining whether the communication includes a reply to a first open query, wherein the first open query represents a question previously presented by the second user directed to the first user. Responsive to determining the communication from the first user includes the reply to the first open query, notifying the second user utilizing a first alert type for the communication from the first user that includes the reply for the first open query, wherein the first alert type is different from a second alert type for notifying the second user regarding a communication that does not include the reply for the first open query.

20 Claims, 5 Drawing Sheets

(51) Int. Cl.
*G06Q 10/10* (2023.01)
*G06F 3/16* (2006.01)

(56) References Cited

U.S. PATENT DOCUMENTS

| | | | | |
|---|---|---|---|---|
| 2007/0219794 | A1* | 9/2007 | Park | G06Q 10/10 |
| | | | | 704/246 |
| 2012/0173992 | A1* | 7/2012 | D'Angelo | G06F 16/3329 |
| | | | | 715/751 |
| 2012/0215523 | A1* | 8/2012 | Inagaki | G06F 16/35 |
| | | | | 704/9 |
| 2014/0052488 | A1* | 2/2014 | Minder | G06Q 10/06 |
| | | | | 705/7.15 |
| 2015/0163188 | A1* | 6/2015 | Faaborg | G06F 3/0481 |
| | | | | 715/753 |
| 2016/0037481 | A1 | 2/2016 | Won | |
| 2016/0063825 | A1* | 3/2016 | Moussette | G08B 3/10 |
| | | | | 340/407.1 |
| 2016/0342900 | A1* | 11/2016 | Allen | G06N 3/006 |
| 2019/0108469 | A1* | 4/2019 | Limaj | G06Q 10/063116 |
| 2019/0386949 | A1* | 12/2019 | Vennam | G06Q 10/109 |
| 2020/0175098 | A1* | 6/2020 | Takahashi | H04L 51/063 |

FOREIGN PATENT DOCUMENTS

| | | |
|---|---|---|
| CN | 103634199 B | 11/2017 |
| WO | 2016018742 A1 | 2/2016 |

OTHER PUBLICATIONS

Mell et al., "The NIST Definition of Cloud Computing", National Institute of Standards and Technology, Special Publication 800-145, Sep. 2011, pp. 1-7.

* cited by examiner

COMMUNICATION NOTIFICATION MANAGEMENT

FIELD OF INVENTION

This disclosure relates generally to electronic communications, and in particular to managing electronic communication notifications.

BACKGROUND OF THE INVENTION

Communication software allows for remote access to various systems and facilitates an exchanging of files and messages in text, audio, and/or video format between multiple users. Presently, whenever a user receives a communication (e.g., email or text message), an alert is generated for the received communication based on user defined setting on an associated client device. However, in a professional setting where the user is working on multiple projects with various teams of users, the user can receive an influx of communications within a narrow period of time. The influx of communications can include various emails, group chat messages, and community forum postings which require the user to manually search for specific information, such as, responses to queries that the user previously presented.

SUMMARY

Embodiments in accordance with the present invention disclose a method, computer program product and computer system for managing electronic communication notifications, the method, computer program product and computer system can responsive to receiving a communication from a first user, identify one or more keywords in the communication from the first user based on a plurality of keywords associated with a plurality of queries previously presented by a second user. The method, computer program product and computer system can determine whether the communication from the first user includes a reply to a first open query from the plurality of queries previously presented by the second user, wherein the first open query represents a question previously presented by the second user directed to the first user. The method, computer program product and computer system can responsive to determining the communication from the first user includes the reply to the first open query based at least on the identified one or more keywords and context of the communication, notify the second user utilizing a first alert type for the communication from the first user that includes the reply for the first open query, wherein the first alert type is different from a second alert type for notifying the second user regarding a communication that does not include the reply for the first open query.

DETAILED DESCRIPTION

Figure 1:
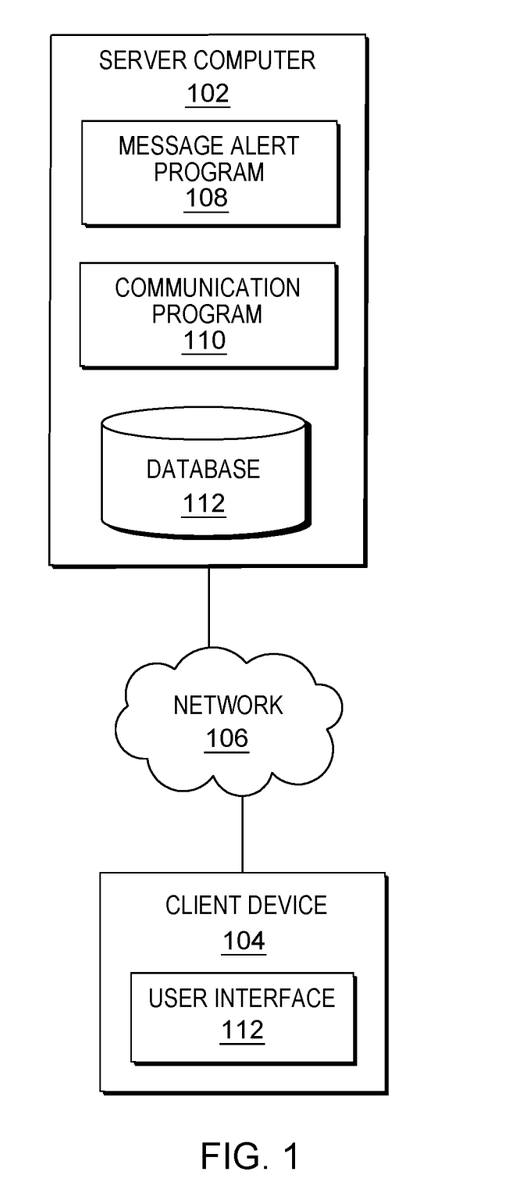
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. The distributed data processing environment includes server computer 102 and client device 104, interconnected over network 106.

Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a personal digital assistant (PDA), a smart phone, or any programmable electronic device capable of communicating with client device 104 and other computing devices (not shown) within the distributed data processing environment via network 106. In another embodiment, server computer 102 represents a computing system utilizing clustered computers and components (e.g., database server computers, application server computers, etc.) that act as a single pool of seamless resources when accessed within distributed data processing environment 100. Server computer 102 includes message alert program 108, communication program 110, and database 112. Server computer 102 may include internal and external hardware components, as depicted and described in further detail with respect to FIG. 3.

Client device 104 can be a laptop computer, a tablet computer, a smart phone, smart watch, a smart speaker, or any programmable electronic device capable of communicating with various components and devices within the distributed data processing environment, via network 106. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 106. In one embodiment, client device 104 represents one or more devices associated with a user. Client device 104 includes an instance of user interface 114 for interacting with message alert program 108 and communication program 110.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks capable of receiving and transmitting data, voice, and/or video signals, including multimedia signals that include voice, data, and video information. In general, network 106 can be any combination of connections and protocols that will support communications between client server computer 102 and client device 104, and other computing devices (not shown).

Message alert program 108 is a communication notification tool for managing alerts associated with notifications on client device 104. Message alert program 108 receives message alert preferences as defined by a user of client device 104, where message alert program 108 associated the message alert preferences with a user profiled and stores the message alert preferences in database 112. Message alert program 108 scans messages (e.g., email communications, text message communications) for queries by the user of client device 104 directed to one or more other users. Message alert program 108 stores each query and keywords associated with each query, where the keywords provide context and a level of urgency for the associated query. Message alert program 108 identifies instances where a reply has not been received for a query and tags each instance as an open query. For each communication that message alert program 108 receives, message alert program 108 identifies keywords in the received message and determines, based on the keywords, whether the message is a reply to an open query. Responsive to determining the received message is not associated with an open query, message alert program 108 displays the message according to the received message alert preferences. Responsive to determining the received message is associated with an open query, message alert program 108 alerts the user regarding the reply for the open query, where the alert is uniquely distinct to signify an increased level of importance for a message that includes a reply to an open query when compared to a message that does not include a reply to an open query.

Communication program 110 represents software utilized to provide remote access to systems and to facilitate an exchanging of files and messages in text, audio, and/or video format between client device 104 and other client devices within the distributed data processing environment (not illustrated in FIG. 1). In this embodiment, message alert program 108 operates independently of communication program 110, where communication program 110 allows message alert program 108 to access text, audio, and/or video format files and messages associated with a user of client device 104 based one or more privacy settings. In another embodiments, message alert program 108 is integrated into communication program 110 as a single operating software for managing communication notifications.

Database 112 is a repository for data used by message alert program 108. In the depicted embodiment, database 112 resides on server computer 102. In another embodiment, database 112 may reside on another device (not illustrated in FIG. 1) within the distributed data processing environment 100 provided message alert program 108 has access to database 112. A database is an organized collection of data. Database 112 can be implemented with any type of storage device capable of storing data and configuration files that can be accessed and utilized by message alert program 108, such as a database server, a hard disk drive, or a flash memory. Database 112 stores data used by message alert program 108, such as user profiles, user preferences, and the like.

Figure 2:
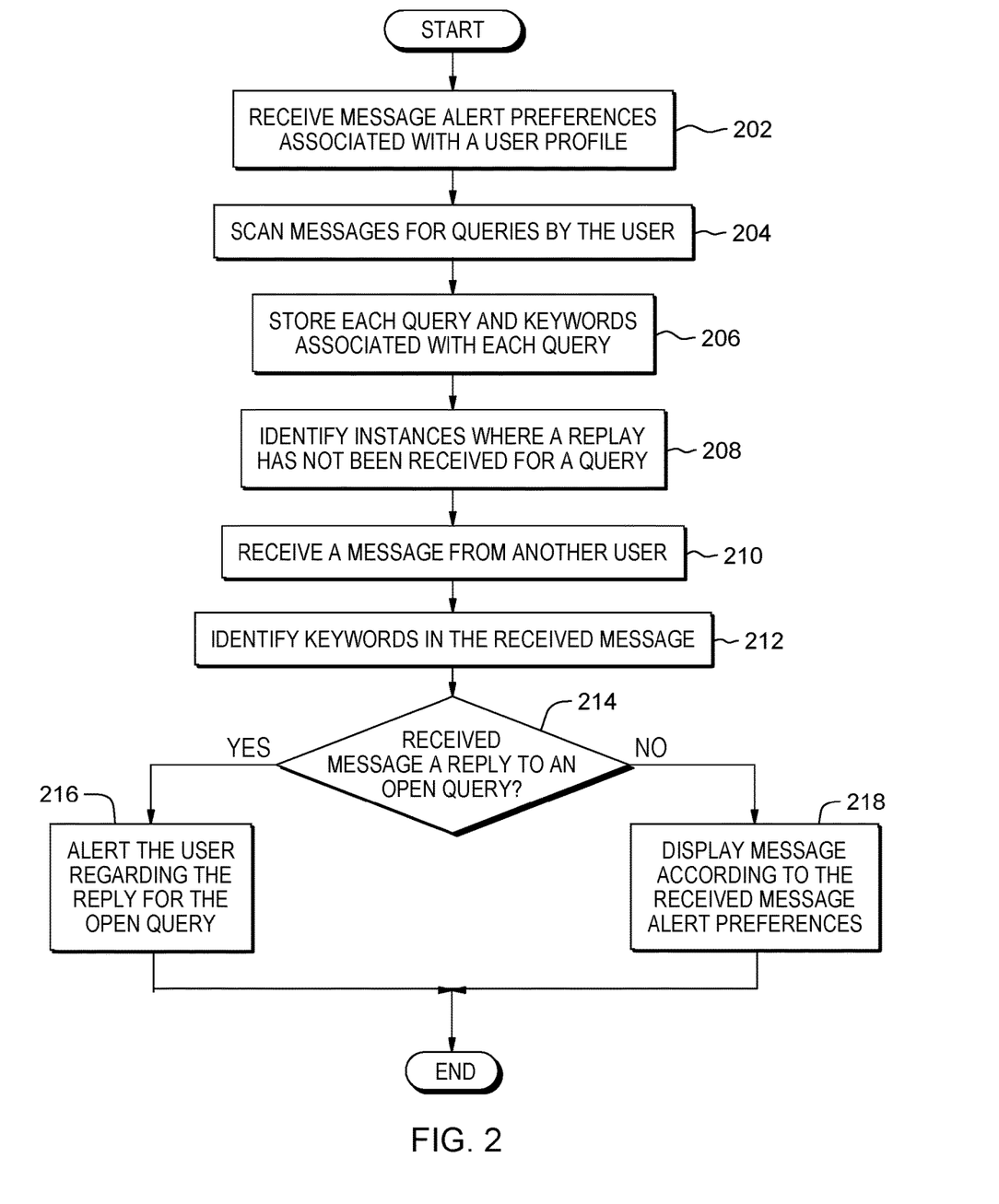
FIG. 2 is a flowchart depicting operational steps of a message alert program for managing communication notifications, in accordance with an embodiment of the present invention.

FIG. 2 is a flowchart depicting operational steps of a message alert program for managing communication notifications, in accordance with an embodiment of the present invention.

Message alert program 108 receives (202) message alert preferences associated with a user profile. For discussion purposes, a message is any type of communication (e.g., text message, email) that includes text, audio, and/or video format content sent from an individual to the user of message alert program 108. Message alert preferences represent personalized settings for how message alert program 108 manages notifications for communications directed to a user. Message alert preferences can include two separate types of communication classes (e.g., professional and social). Each of the two separate types of communication classes can further include subclasses based on varies grouping of individuals in each of the two separate types, where a single individual can belong to multiple subclasses across both types of communication classes. For example, individual A can belong to both the professional and the social communications classes and furthermore, individual A can belong to two subclasses in the professional classes based on various teams and/or projects individual A is associated with. Message alert preferences are customizable across the multiple subclasses and the two separate types of communication classes, where a message alert preference for individual A in the social communication class differs from a message alert preference for individual in the professional communication class.

The message alert preferences that message alert program 108 receives can further include distinguishing notifications for general messages and urgent messages. For example, a general message can include a passive notification (e.g., visual indication) compared to an urgent message which can include an assertive notification (e.g., audible indication) to draw the attention of the user to the urgent message. Message alert program 108 utilizes context based on recipients and one or more keywords identified in the received message to determine whether or not the received message is urgent. The message alert preferences that message alert program 108 receives can further include distinguishing notifications for general messages and messages with a reply to one or more open queries. For example, a general message can include a passive notification compared to a message with a reply to an open query (i.e., question asked by the user) which can include an assertive notification. Similar to message urgency, message alert program 108 utilizes context based on recipients, one or more keywords identified in the received message, and one or more keywords associated with the open queries, to determine whether or not the message is a reply to an open query.

Message alert program 108 scans (204) messages for queries by the user. In this embodiment, message alert program 108 scans previously sent and received messages for queries by the user directed to one or more individuals. Message alert program 108 scans messages (e.g., text messages, emails) between the user and the one or more individuals to identify queries (i.e., questions) that the user presented to the one or more individuals and one or more keywords that provide context for the identified queries. Message alert program 108 can utilize natural language processing to scan through the messages to identify instances of queries being presented by the user to the one or more individuals and message alert program 108 can associate each query from the identified queries with one or more keywords that provide context. In one example, message alert program 108 identifies a query in a previously sent message from the user directed to individual A that states, "Will the presentation be ready for our meeting at noon?" Message alert program 108 determines the user directed the query at individual A and identifies the keywords as, "presentation", "ready", "meeting", and "noon". Message alert program 108 utilizes the identified keywords to determine if subsequently messages sent by individual A include a reply to an identified query. In another example, message alert program 108 identifies a query in a previously sent message in from the user directed to individual A that states, "Is the meeting starting at 12 pm? . . . or has it been pushed to 1 pm?" Though there are two separate questions, message alert program 108 identifies the two separate questions as a single query by the user because the two separate questions are directed to the same topic (i.e., a start of a meeting). Message alert program 108 determines the user directed the query at individual A and identifies the keywords as "meeting", "starting", and "pushed".

Message alert program 108 stores (206) each query and keywords associated with each query. In this embodiment, message alert program 108 stores each identified query and the keywords associated with each query in a database (e.g., database 112) to subsequently identify keywords in messages received from one or more individuals and determine whether the received messages include a reply to an open query. Furthermore, message alert program 108 has self-learning capabilities and can utilize the stored queries and keywords associated with each query for training to assist in identifying future queries directed to one or more individuals. Since a user of message alert program 108 can utilize formal language in a professional setting when compared to informal language in a social setting, message alert program 108 can utilize the stored queries, associated keywords, and recipients (i.e., individuals) of each query to train the natural language processor to identify queries directed to one or more individuals.

Message alert program 108 identifies (208) instances where a reply has not been received for a query. Message alert program 108 scans messages previously received during an exchange with one or more individuals and identifies instances where a reply has not been received from the one or more individuals for a query presented by the user. Message alert program 108 utilizes the stored queries and associated keywords to scan the previously received messages for replies to the stored queries. For each stored query that message alert program 108 identifies as having an associated reply, message alert program 108 tags the stored query as closed, signifying that a question asked by the user directed to one or more individuals has been answered by the one or more individuals. For each stored query that message alert program 108 identifies as not having an associated reply, message alert program tags the stored query as open, signifying that a question asked by the user directed to one or more individuals has not yet been answered. Furthermore, for each stored query that message alert program 108 identifies as having an associated reply, where the associated reply was received from an individual whom the query was not directed to, message alert program 108 tags the stored query as inconclusive.

Message alert program 108 receives (210) a message from another user. Message alert program 108 identifies the other user (i.e., sender) based on the communication classes and subclasses previously defined in the user profile associated with the user of message alert program 108. Furthermore, message alert program 108 determines whether or not the other user was an individual engaging in communication. In one example, message alert program 108 receives a message from another user, where the other user is an individual who is part of a workplace team on a group project. Message alert program 108 identifies the other user based on an email address associated with the received message (i.e., email) and determines the other user is an individual who belongs in the professional communication class as previously defined by user profile. In another example, message alert program 108 receives a message from another user and identifies the other user based on a phone number associated with the received text message. Based on a phone number associated with the received message (i.e., text message), message alert program 108 determines the other user is an individual who belongs in the social communication class as defined by the user profile.

Message alert program 108 identifies (212) keywords in the received message. In this embodiment, message alert program 108 utilizes a list of previously stored keywords associated with previously stored queries to identify keywords in the received message. For each received messages, message alert program 108 identifies keywords by matching each keyword to a previously stored keyword associated with a previously stored query, previously discussed with respect to (206). Message alert program 108 can match keywords in the received message to one to a previously stored keyword associated with a previously stored query that message alert program 108 previously tagged as an open query to which an individual has not yet replied to. Alternatively, message alert program 108 can match keywords in the received message to one to a previously stored keyword associated with a previously stored query that message alert program 108 previously tagged as an open query or a closed query.

In another embodiment, message alert program 108 identifies keywords in the received message utilizing natural language processing to scan for one or more keywords that potentially provide context to received message. Message alert program 108 determines a context based on the identified keywords in the received messages, where context identifies an intention of the received message. In one example, message alert program 108 receives a message from individual A directed to the user that states, "Yes, the presentation will be ready by noon." Message alert program 108 identifies the keywords as "yes", "presentation", "ready", and "noon" and determines that the context of the received message indicates a reply to a question due to the confirming keyword, "yes". Message alert program 108 utilizes the identified keywords and the determined context (i.e., reply) to determine whether the received message is a reply to an open query. In another example, message alert program 108 receives a message from individual A directed to the user that states, "The meeting has been pushed to 1 pm." Message alert program 108 identifies the keywords as "meeting", "pushed", and "1 pm" and determines that context of the received message indicates a statement. Message alert program 108 utilizes the identifies keywords and the determined context (i.e., statement) to determine whether the received messages includes a reply to an open query.

Message alert program 108 determines (decision 216) whether the received message includes a reply to an open query. In the event message alert program 108 determines the received message includes a reply to an open query ("yes" branch, decision 214), message alert program 108 alerts (216) the user regarding the reply to the open query. In the event message alert program 108 determines the received message does not include a reply to the open query ("no" branch, decision 210), message alert program 108 displays (218) the message according to the received message alert preferences.

Message alert program 108 determines whether the receives message includes a reply to an open query based on the identified keywords, determined context, and another user who sent the received message. For identified keyword, message alert program 108 compares the one or more identified keywords in the received messages to the stored keywords associated with each of the stored queries. Message alert program 108 can utilize a keyword count threshold and a keyword variation threshold to compare and identifying matching keywords. In one example, message alert program 108 utilizes a keyword count threshold with a value set to one keyword, where a single common keyword between the received message and a stored query represents a match and potential reply to an open query. If a number of matches exceeds a predetermined quantity (e.g., five matches), message alert program 108 updates the keyword count threshold to a higher value set to two keywords, where two common keywords between the received message and a stored query represents a match and potential reply to an open query. Message alert program 108 applies the updated threshold to the already matched stored queries with a potential reply to an open query until the number of matches falls below the predetermined quantity. For the keyword variation threshold, message alert program 108 has the ability to limit variations of a keyword when comparing and identifying matching keywords. For example, message alert program 108 can utilizes a keyword variation threshold, where a keyword, "version 8.16" in a received message does not meet the keyword variation threshold compared to a previously stored query with an associated keyword, "version 8.20". The keyword variation threshold allows for message alert program 108 to filter received messages for replies directed to the specific "version 8.20" versus "version 8.16" and allows message alert program 108 to determine whether the received message includes a reply to an open query directed to the specific "version 8.20".

For determined context, message alert program 108 determines whether the determined context for the received message is representative of a reply to an open query. In one example, if message alert program 108 determines that the context of the received message indicates a reply with a confirming keyword (e.g., "yes"), message alert program 108 determines the received message has a higher potential of including a reply to an open query. In another example, if message alert program 108 determines that the context of the received message indicates a statement with multiple matching keywords, message alert program 108 determines the received message has a higher potential of including a reply to an open query. However, if message alert program determines that the context of the received message indicates a statement with no matching keywords or a number of matching keywords below the keyword count threshold, message alert program 108 determines the received message has a lower potential of including a reply to an open query. For the determined user (i.e., individual) responsible for sending the received message, message alert program 108 determines whether an open query is directed to the individual responsible for sending the received message. If message alert program 108 determines there is an open query directed to the individual responsible for sending the received message, message alert program 108 determines the received message has a higher potential of including a reply to an open query. If message alert program 108 determines there is no query directed to the individual responsible for sending the received message, message alert program 108 determines the received message has a lower potential of including a reply to an open query.

In one example, message alert program 108 previously identified an open query awaiting a reply in a previously sent message from the user directed to individual A that states, "Can you please send me the presentation for our meeting at noon ASAP?" Message alert program 108 received a message from individual A directed to the user that states, "Yes, the presentation will be ready by noon?" Message alert program 108 determines the received message from individual A includes a reply to an open query based on match keywords (i.e., "presentation", "ready", "noon"), a determined context (i.e., reply), and another user (i.e., individual A) who sent the received message. In another example, message alert program 108 previously identified an open query awaiting a reply in a previously sent message from the user directed to individual A that states, "Is the meeting starting at 12 pm? . . . or has it been pushed to 1 pm?" Message alert program 108 received a message from individual A directed to the user that states, "The meeting has been pushed to 1 pm." Message alert program 108 determines the received message from individual A includes a reply to an open query based on match keywords (i.e., "meeting", "pushed"), a determined context (i.e., statement), and another user (i.e., individual A) who sent the received message.

Message alert program 108 alerts (216) the user regarding the reply to the open query. Message alert program 108 utilizes message alert preferences associated with the user profile for the user to determine a type (e.g., visual, audible, haptic, vibration) of alert to notify the user regarding the received reply to the open query. Message alert program 108 utilizes a distinctly different alert to notify the user regarding the reply to the open query compared to a general alert setting for notification on the client device of the user. In one example, the user is engaging in conversation utilizing a collaboration platform with three other users, individual A, individual B, and individual C. Message alert program 108 previously identified that the user directed a query to individual A and message alert program 108 subsequently determines that a received message from individual A includes a reply to the query. Message alert program 108 alerts the user regarding the reply to the open query by utilizes an alert distinctly different from an alert being utilized for other received messages that do not include a reply to open query. Message alert program 108 utilizes an audible alert for the received message that includes a reply to an open query and utilizes a vibration alert for any received message that does not include a reply to an open query. In another example, message alert program 108 utilizes a first audible alert for the received message that includes a reply to an open query and a second audible alert for any received message that does not include a reply to an open query, where the first audible alert is different from the second audible alert. In yet another example, message alert program 108 alerts the user by highlighting the received message that includes a reply to an open query in a first color and highlighting any received message that does not include a reply to an open query in a second color, where the first color is different from the second color. In yet another example, message alert program 108 sends an alert to a first device associated with the user (e.g., wearable smart watch device) for the received message that includes a reply to an open query and sends an alert to a second device associated with the user (e.g., smartphone) for any received message that does not include a reply to an open query, where the first device is different from the second device.

In another example, the user of message alert program 108 is currently presenting in a meeting, where the user does not want to be disturbed with notifications regarding newly received messages unless the received message includes a reply to an open query. The user of message alert program 108 previously directed a query to individual A stating, "Are the $2^{nd}$ quarter business results accurate on slide 19 for our meeting at 1 pm?" Message alert program 108 previously identified the question presented by the user as an open query, which is still awaiting a reply from individual A. Message alert program 108 can automatically resend the message in set intervals (e.g., every 5 minutes) with an additional tag indicating that the user is still awaiting a response for the presented question until message alert program 108 receives a message from individual A that includes the reply to the open query. Since the user is currently presenting in the meeting, message alert program 108 has set the notification delivery settings for the user to silent (i.e., do not disturb), except for a message that includes a reply to the open query. Message alert program 108 alerts the user regarding the reply to the open query utilizing one or more methods of delivering a notification to the user, such as, a vibration and subsequent displaying of the message with the reply to the user on a wearable smart watch device. Therefore, the user read the message containing the reply to the open query without pausing or interrupting the presentation. Message alert program 108 also has the ability of consolidating a message with a reply to the open query to a confirmation (e.g., "yes") or denial (e.g., "no"). Continuing from the example above, message alert program 108 receives the following message from individual A stating, "Yes, slide 19 has the correct values", where message alert program 108 determines that the message includes a reply to the open query. Since message alert program 108 has set the notification delivery settings for the user to silent (i.e., do not disturb), message alert program 108 truncates the received message from individual A to, "Yes" prior to alerting the user of the received message with the reply to open query.

In another embodiment, message alert program 108 has the ability to display a list of one or more open queries that still have not yet received a response from an individual to whom the one or more open queries were directed towards. Message alert program 108 can alert the user in set intervals (e.g., every 15 minutes) with a notification (e.g., email, text message) that includes a list of the one or more open queries and a list of associated individuals for each of the one or more queries, where an open query from the list of the one or more open queries is selectable for message alert program 108 to resend the query to the associated individual. Furthermore, message alert program 108 has the ability to analyze each of the one or more open queries to determine if an associated deadline for responding to each of the open queries is approaching or passed. If message alert program 108 determines an associated deadline for an open query is approaching based on a time threshold (e.g. 30 minutes from a meeting that starts at 1 PM), message alert program 108 can automatically resend the open query to the individual via a previously utilized communication method (e.g., text message) and/or another communication method (e.g., email) different from the previously utilized communication method. If message alert program 108 determines an associated deadline for an open query has passed, message alert program 108 can remove the open query from the list of one or more open queries and notify the user of the removal.

Message alert program 108 displays (218) the message according to the received message alert preferences. Message alert program 108 utilizes message alert preferences associated with the user profile for the user to determine a type (e.g., visual, audible, haptic, vibration) of alert to notify the user regarding the received reply which does not include a reply to an open query.

Figure 3:
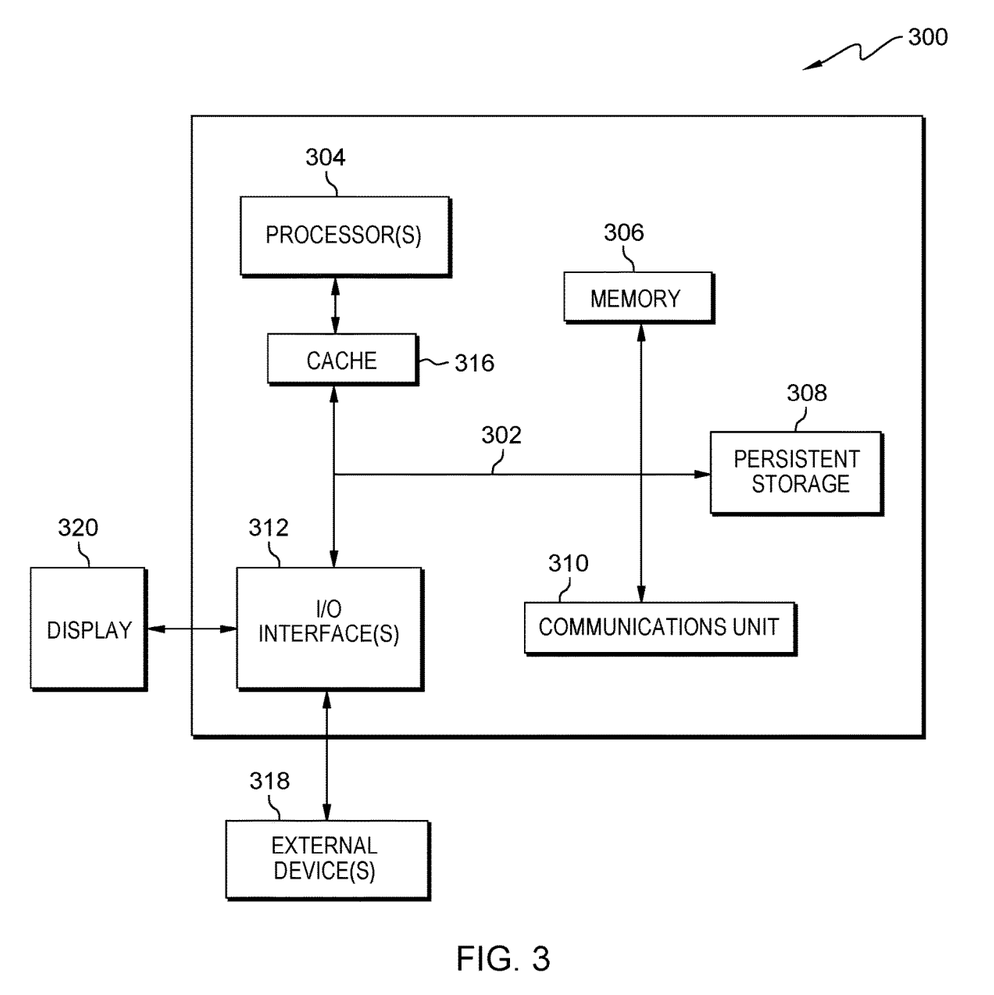
FIG. 3 is a block diagram of components of a computer system, such as the server computer of FIG. 1, in accordance with an embodiment of the present invention.

FIG. 3 depicts computer system 300, where server computer 102 is an example of a computer system 300 that includes message alert program 108. The computer system includes processors 304, cache 316, memory 306, persistent storage 308, communications unit 310, input/output (I/O) interface(s) 312 and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data, and data near recently accessed data, from memory 306.

Program instructions and data used to practice embodiments of the present invention may be stored in persistent storage 308 and in memory 306 for execution by one or more of the respective processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
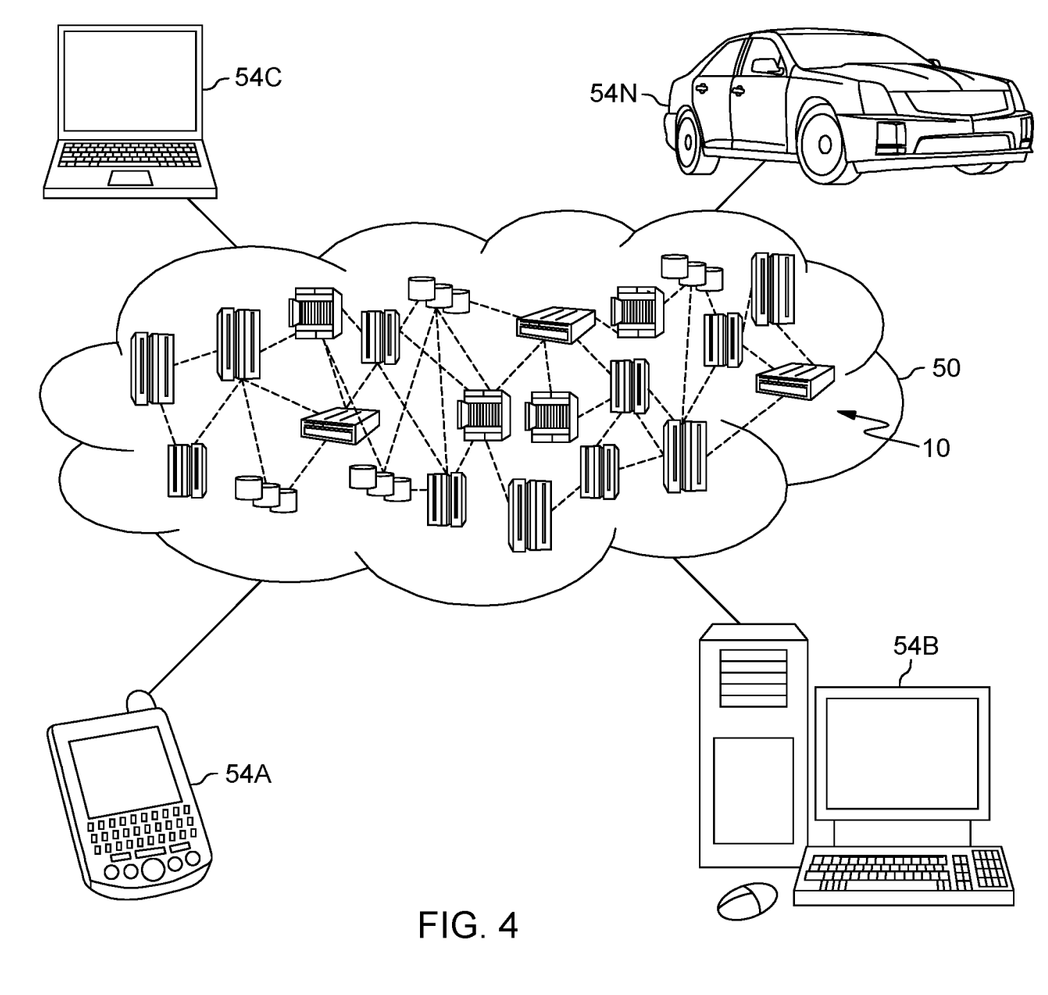
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
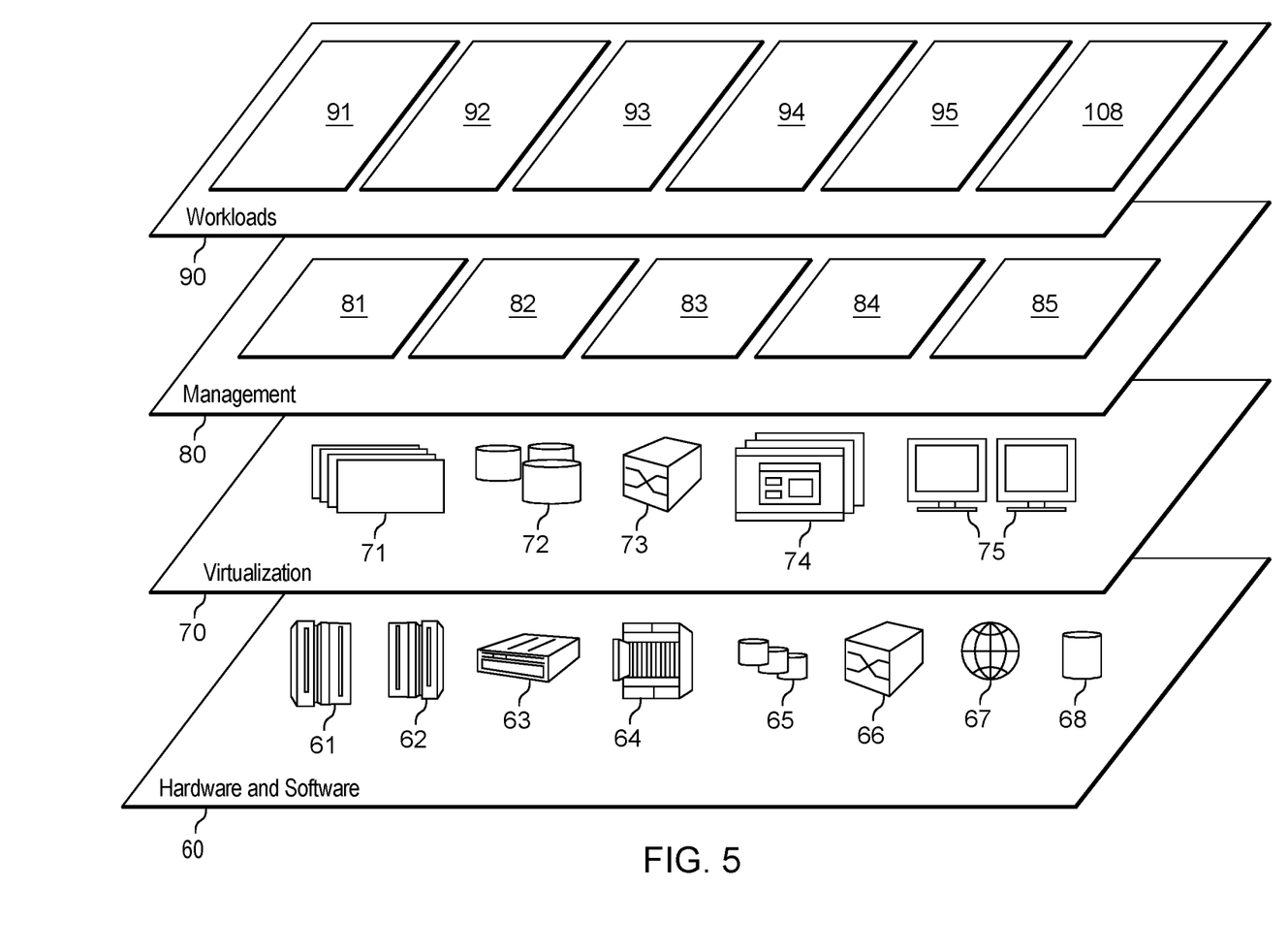
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message alert program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing notifications for an influx of electronic communications, the method comprising:

responsive to receiving an electronic communication from a first user, identifying, by one or more processors, utilizing natural language processing, one or more keywords in the electronic communication from the first user based on a plurality of keywords associated with a plurality of queries previously presented by a second user;

determining, by one or more processors, whether the electronic communication from the first user includes a reply to a first open query from the plurality of queries previously presented by the second user, wherein the first open query represents a question previously presented by the second user directed to the first user;

determining whether the electronic communication from the first user includes the reply to the first open query based at least on the identified one or more keywords and context of the electronic communication, wherein the identified one or more keywords are compared to a keyword count threshold and a keyword variation threshold for the plurality of keywords associated with the plurality of queries;

responsive to determining the electronic communication from the first user includes the reply to the first open query, sending, by one or more processors, a first alert to a first client device associated with the second user utilizing a first audible alert type that indicates the electronic communication received from the first user includes the reply for the first open query; and sending, by one or more processors, a second alert to a second client device associated with the second user utilizing a second audible alert type that indicates another electronic communication does not include the reply for the first open query, wherein the first audible alert type is different from the second audible alert type.

2. The method of claim 1, further comprising:

scanning, by one or more processors, a plurality of messages associated with the second user for the plurality of keywords;

identifying, by one or more processors, each query from the plurality of queries previously presented by the second user in the plurality of messages based on the plurality of keywords, wherein one or more keywords from the plurality of keywords that provide context for each message from the plurality of messages associated with the second user; and storing, by one or more processors, each query from the plurality of queries presented by the second user, along with the one or more keywords from the plurality of keywords associated with each query.

3. The method of claim 2, further comprising:

identifying, by one or more processors, a plurality of open queries from the plurality of queries, wherein each open query from the plurality of open queries do not have a reply from an identified user to whom the query was directed towards.

4. The method of claim 1, further comprising:

displaying, by one or more processors, a list of the plurality of open queries and a list of a plurality of associated users to whom the second user directed the plurality of open queries, wherein each open query from the list of the plurality of open queries is selectable by the second user to resend the query to an associated user from the list of the plurality of associated user;

responsive to receiving a selection of the first open query from the list of the plurality of open queries, sending, by one or more processors, the first open query to a first client device associated with the first user from the list of the plurality of associated of users.

5. The method of claim 4, wherein the first open query was previously sent to a second client device associated with the first user, wherein the first client device associated with the first user is different from the second client device associated with the first user.

6. The method of claim 1, further comprising:

responsive to determining an associated deadline for replying to a second open query is approaching based on a time threshold, sending, by one or more processors, the second open query to a first client device of a user to whom the second open query was directed towards.

7. The method of claim 6, wherein the second open query was previously sent to a second client device of the user to whom the second open query was directed towards, wherein the first client device is different from the second client device.

8. A computer program product for managing notifications for an influx of electronic communications, the computer program product comprising:
one or more computer readable storage media and program instructions stored on at least one of the one or more storage media, the program instructions comprising:
program instructions to, responsive to receiving an electronic communication from a first user, identify, utilizing natural language processing, one or more keywords in the electronic communication from the first user based on a plurality of keywords associated with a plurality of queries previously presented by a second user;
program instructions to determine whether the electronic communication from the first user includes a reply to a first open query from the plurality of queries previously presented by the second user, wherein the first open query represents a question previously presented by the second user directed to the first user;
program instructions to determine whether the electronic communication from the first user includes the reply to the first open query based at least on the identified one or more keywords and context of the electronic communication, wherein the identified one or more keywords are compared to a keyword count threshold and a keyword variation threshold for the plurality of keywords associated with the plurality of queries;
program instructions to, responsive to determining the electronic communication from the first user includes the reply to the first open query, send a first alert to a first client device associated with the second user utilizing a first audible alert type that indicates the electronic communication received from the first user includes the reply for the first open query; and
program instructions to send a second alert to a second client device associated with the second user utilizing a second audible alert type that indicates another electronic communication does not include the reply for the first open query, wherein the first audible alert type is different from second audible alert type.

9. The computer program product of claim 8, further comprising program instructions, stored on the one or more computer readable storage media, which when executed by a processor, cause the processor to:
scan a plurality of messages associated with the second user for the plurality of keywords;
identify each query from the plurality of queries previously presented by the second user in the plurality of messages based on the plurality of keywords, wherein one or more keywords from the plurality of keywords that provide context for each message from the plurality of messages associated with the second user; and
store each query from the plurality of queries presented by the second user, along with the one or more keywords from the plurality of keywords associated with each query.

10. The computer program product of claim 9, further comprising program instructions, stored on the one or more computer readable storage media, which when executed by a processor, cause the processor to:
identify a plurality of open queries from the plurality of queries, wherein each open query from the plurality of open queries do not have a reply from an identified user to whom the query was directed towards.

11. The computer program product of claim 8, further comprising program instructions, stored on the one or more computer readable storage media, which when executed by a processor, cause the processor to:
display a list of the plurality of open queries and a list of a plurality of associated users to whom the second user directed the plurality of open queries, wherein each open query from the list of the plurality of open queries is selectable by the second user to resend the query to an associated user from the list of the plurality of associated user;
responsive to receiving a selection of the first open query from the list of the plurality of open queries, send the first open query to a first client device associated with the first user from the list of the plurality of associated of users.

12. The computer program product of claim 11, wherein the first open query was previously sent to a second client device associated with the first user, wherein the first client device associated with the first user is different from the second client device associated with the first user.

13. The computer program product of claim 8, further comprising program instructions, stored on the one or more computer readable storage media, which when executed by a processor, cause the processor to:
responsive to determining an associated deadline for replying to a second open query is approaching based on a time threshold, send the second open query to a first client device of a user to whom the second open query was directed towards.

14. The computer program product of claim 13, wherein the second open query was previously sent to a second client device of the user to whom the second open query was directed towards, wherein the first client device is different from the second client device.

15. A computer system for managing notifications for an influx of electronic communications, the computer system comprising:
one or more computer processors;
one or more computer readable storage media; and
program instructions stored on the computer readable storage media for execution by at least one of the one or more computer processors, the program instructions comprising:
program instructions to, responsive to receiving an electronic communication from a first user, identify, utilizing natural language processing, one or more keywords in the electronic communication from the first user based on a plurality of keywords associated with a plurality of queries previously presented by a second user;
program instructions to determine whether the electronic communication from the first user includes a reply to a first open query from the plurality of queries previously presented by the second user, wherein the first open query represents a question previously presented by the second user directed to the first user;
program instructions to determine whether the electronic communication from the first user includes the reply to the first open query based at least on the identified one or more keywords and context of the electronic communication, wherein the identified one or more keywords are compared to a keyword count threshold and a keyword variation threshold for the plurality of keywords associated with the plurality of queries;

program instructions to, responsive to determining the electronic communication from the first user includes the reply to the first open query, send a first alert to a first client device associated with the second user utilizing a first audible alert type that indicates the electronic communication received from the first user includes the reply for the first open query; and program instructions to send a second alert to a second client device associated with the second user utilizing a second audible alert type that indicates another electronic communication does not include the reply for the first open query, wherein the first audible alert type is different from second audible alert type.

16. The computer system of claim 15, further comprising program instructions, stored on the one or more computer readable storage media, which when executed by a processor, cause the processor to:

scan a plurality of messages associated with the second user for the plurality of keywords;

identify each query from the plurality of queries previously presented by the second user in the plurality of messages based on the plurality of keywords, wherein one or more keywords from the plurality of keywords that provide context for each message from the plurality of messages associated with the second user; and store each query from the plurality of queries presented by the second user with the one or more keywords from the plurality of keywords associated with each query.

17. The computer system of claim 16, further comprising program instructions, stored on the one or more computer readable storage media, which when executed by a processor, cause the processor to:

identify a plurality of open queries from the plurality of queries, wherein each open query from the plurality of open queries do not have a reply from an identified user to whom the query was directed towards.

18. The computer system of claim 15, further comprising program instructions, stored on the one or more computer readable storage media, which when executed by a processor, cause the processor to:

display a list of the plurality of open queries and a list of a plurality of associated users to whom the second user directed the plurality of open queries, wherein each open query from the list of the plurality of open queries is selectable by the second user to resend the query to an associated user from the list of the plurality of associated user;

responsive to receiving a selection of the first open query from the list of the plurality of open queries, send the first open query to a first client device associated with the first user from the list of the plurality of associated of users.

19. The computer system of claim 18, wherein the first open query was previously sent to a second client device associated with the first user, wherein the first client device associated with the first user is different from the second client device associated with the first user.

20. The computer system of claim 15, further comprising program instructions, stored on the one or more computer readable storage media, which when executed by a processor, cause the processor to:

responsive to determining an associated deadline for replying to a second open query is approaching based on a time threshold, send the second open query to a first client device of a user to whom the second open query was directed towards.

* * * * *